United States Patent
Agarwal et al.

(10) Patent No.: US 9,721,564 B2
(45) Date of Patent: Aug. 1, 2017

(54) SYSTEMS AND METHODS FOR PERFORMING ASR IN THE PRESENCE OF HETEROGRAPHS

(71) Applicant: Rovi Guides, Inc., Santa Clara, CA (US)

(72) Inventors: Akshat Agarwal, Delhi (IN); Rakesh Barve, Bangalore (IN)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/448,308

(22) Filed: Jul. 31, 2014

(65) Prior Publication Data

US 2016/0035347 A1    Feb. 4, 2016

(51) Int. Cl.
  G10L 15/187  (2013.01)
  G10L 15/193  (2013.01)
  G10L 15/18   (2013.01)

(52) U.S. Cl.
  CPC .......... *G10L 15/187* (2013.01); *G10L 15/193* (2013.01); *G10L 15/1815* (2013.01)

(58) Field of Classification Search
  CPC .................................................. G10L 15/187
  See application file for complete search history.

(56) References Cited

U.S. PATENT DOCUMENTS

| | | | |
|---|---|---|---|
| 4,980,918 A | 12/1990 | Bahl et al. | |
| 6,182,038 B1 | 1/2001 | Balakrishnan et al. | |
| 6,236,968 B1 | 5/2001 | Kanevsky | |
| 6,269,335 B1 | 7/2001 | Ittycheriah et al. | |
| 6,370,503 B1 | 4/2002 | Ortega | |
| 7,693,720 B2 | 4/2010 | Kennewick | |
| 7,818,179 B2 | 10/2010 | Krasikov | |
| 8,606,577 B1 | 12/2013 | Stewart | |
| 2007/0100618 A1* | 5/2007 | Lee | G10L 15/1822 704/238 |
| 2007/0225980 A1 | 9/2007 | Sumita | |
| 2008/0208563 A1 | 8/2008 | Sumita | |
| 2008/0270110 A1 | 10/2008 | Yurick et al. | |
| 2012/0029917 A1* | 2/2012 | Chang | H04L 12/588 704/235 |
| 2014/0012582 A1 | 1/2014 | Ganong et al. | |
| 2014/0081626 A1* | 3/2014 | Chang | G06F 17/2785 704/9 |
| 2014/0122069 A1 | 5/2014 | Bravin | |
| 2014/0195238 A1* | 7/2014 | Terao | G10L 15/02 704/251 |
| 2015/0161521 A1* | 6/2015 | Shah | G06F 3/0481 706/12 |

FOREIGN PATENT DOCUMENTS

| | | |
|---|---|---|
| WO | WO 2009/105639 | 8/2009 |
| WO | WO 2012/177646 | 12/2012 |
| WO | WO 2015077398 | 5/2015 |

* cited by examiner

*Primary Examiner* — Qian Yang
(74) *Attorney, Agent, or Firm* — Ropes & Gray LLP

(57) ABSTRACT

Systems and methods for performing ASR in the presence of heterographs are provided. Verbal input is received from the user that includes a plurality of utterances. A first of the plurality of utterances is matched to a first word. It is determined that a second utterance in the plurality of utterances matches a plurality of words that is in a same heterograph set. It is identified which one of the plurality of words is associated with a context of the first word. A function is performed based on the first word and the identified one of the plurality of words.

18 Claims, 5 Drawing Sheets

600

| Phoneme Sequence | Words / Heterographs |
|---|---|
| (jukɒn) | Yukon, Uconn |
| (bɔld) | Bald, Balled, Bawled |
| (sɛnsər) | Censer, Censor, Sensor |
| (kɔrs) | Coarse, Corse, Course |
| ⋮ | ⋮ |

SYSTEMS AND METHODS FOR PERFORMING ASR IN THE PRESENCE OF HETEROGRAPHS

BACKGROUND

Conventional automatic speech recognition (ASR) systems typically perform well in converting speech to text. However, in some cases, the same speech sounds map to different words with different meanings. These types of words are commonly known as heterographs. In these situations, conventional ASR systems will either choose one of the words matching the received speech at random or request input from the user to clarify which word to use. This results in either the wrong output or frustration for the user.

SUMMARY

Accordingly, methods and systems are disclosed herein for performing ASR in the presence of heterographs.

In some embodiments, verbal input is received from the user that includes a plurality of utterances. A first of the plurality of utterances is matched to a first word. In some embodiments, the first utterance is encoded into a phoneme sequence and represented using IPA. The phoneme sequence is cross-referenced with a database of phoneme sequences to identify the first word that matches the phoneme sequence.

In some embodiments, a determination is made that a second utterance in the plurality of utterances matches a plurality of words that is in a same heterograph set. In particular, the plurality of words in the same heterograph set may be phonetically similar to each other. In some embodiments, the second utterance is encoded into a phoneme sequence and represented using IPA. The phoneme sequence is cross-referenced with a database of phoneme sequences to identify a plurality of words that matches the phoneme sequence. In response to determining that a plurality of words matches the same phoneme sequence, a context of the first word is determined. The system then identifies which one of the plurality of words that matches the second phoneme sequence is associated with the context of the first word. A function is performed based on the first word and the identified one of the plurality of words. For example, a search is performed using the first word and only one of the words that match the second sequence having the same or similar context as the first word.

In some embodiments, a knowledge graph of a relationship between words is stored. A distance between words in the knowledge graph may be indicative of strength in relationship between the words. The one of the plurality of words that matches the context is determined based on a distance between each of the plurality of words in the heterograph set to the first word in the knowledge graph. In some implementations, positions of the first word in the knowledge graph and each of the plurality of words are identified. A distance between the first word and each of the plurality of words is computed based on the identified positions. The word in the plurality having a shortest distance that has been computed to the first word is selected as the identified one of the plurality of words.

In some embodiments, the first word may be a name of a competitor in a sporting event. In such cases, the context of the first word may be set to be the sporting event. A determination is made as to which of the plurality of words corresponds to the sporting event, where the identified one of the plurality of words corresponds to another competitor (e.g., another team) in the sporting event.

In some embodiments, the first word may be a name of an actor in a media asset. The context may be set to be the media asset. A determination is made as to which of the plurality of words corresponds to the media asset, where the identified one of the plurality of words corresponds to another actor in the media asset.

In some embodiments, the context may be determined based on a conjunction between two of the plurality of utterances. For example, if the user utters the word "v." in a phrase as a conjunction between two words, the context may be determined to be a sporting event where the v. represents "versus".

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 shows an illustrative database for associating phoneme sequences with heterographs in accordance with some embodiments of the disclosure.

DETAILED DESCRIPTION OF DRAWINGS

Figure 1:
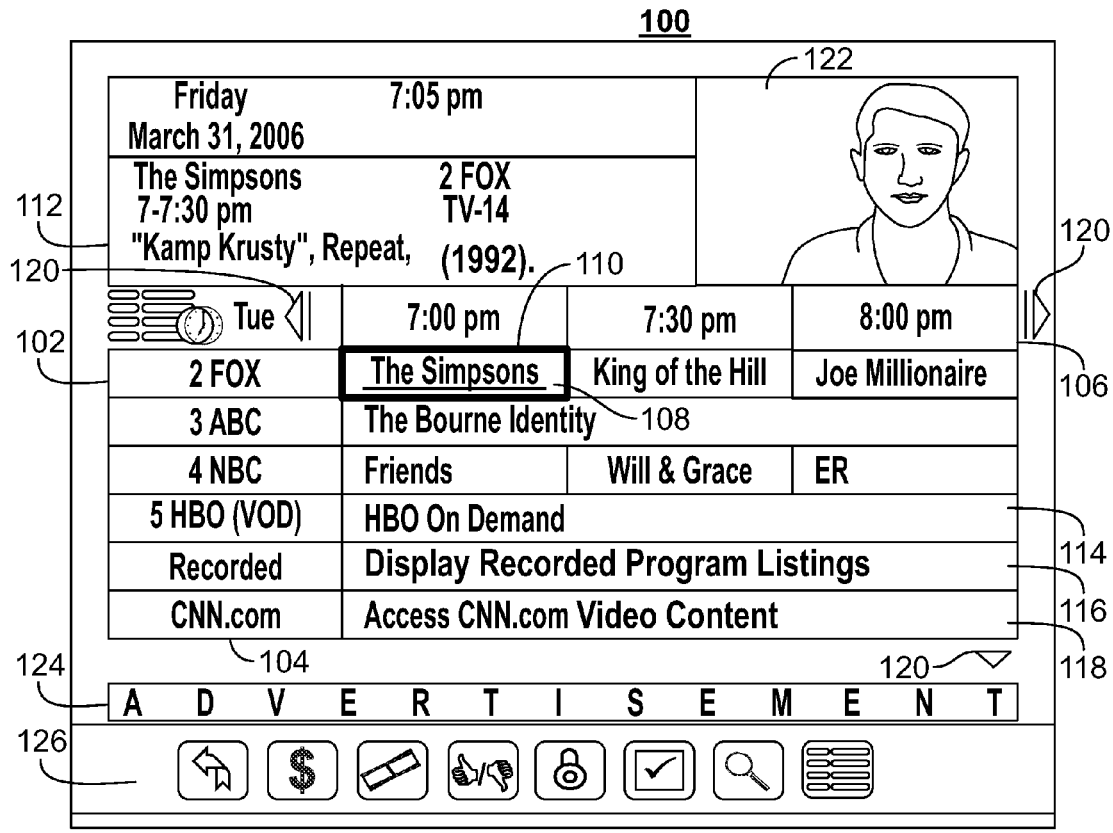
FIGS. 1 and 2 show illustrative display screens that may be used to provide media guidance application listings in accordance with an embodiment of the invention.

Methods and systems are disclosed herein for performing ASR in the presence of heterographs. In particular, a plurality of utterances may be received from the user. The utterances may be represented using phoneme sequences. In some cases, a particular phoneme sequence may match multiple words. These words may be in the same heterograph set. A first word of the words in the heterograph set may be selected for processing together with a second word that is detected in the received utterances based on how close or far the first word is to the second word in a knowledge graph. Although this disclosure is discussed with reference to IPA phonetic encoding any other type of phonetic encoding or representation system can be used (e.g., SAMPA, X-SAMPA, Arpabet, extIPA, Kirshenbaum, etc.).

For example, if two words are in the same heterograph set, the system may select the word in the set that is more closely related to another received word for processing together with the another received word. Specifically, if the user is searching for basketball games between the teams Duke and Uconn, the user may utter the phrase "Duke v. Uconn". The system may determine that the phoneme sequence for the utterance "Uconn" matches two words (e.g., Uconn and Yukon). The system selects the word Uconn instead of Yukon given that Uconn (i.e., the basketball team) is closer to Duke (i.e., the other received utterance) than Yukon (i.e., the river).

With reference to media assets or content, the amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, data used for generating a knowledge graph indicating weighted relationships between words, phoneme sequences mapping to words, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), subtitles, media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
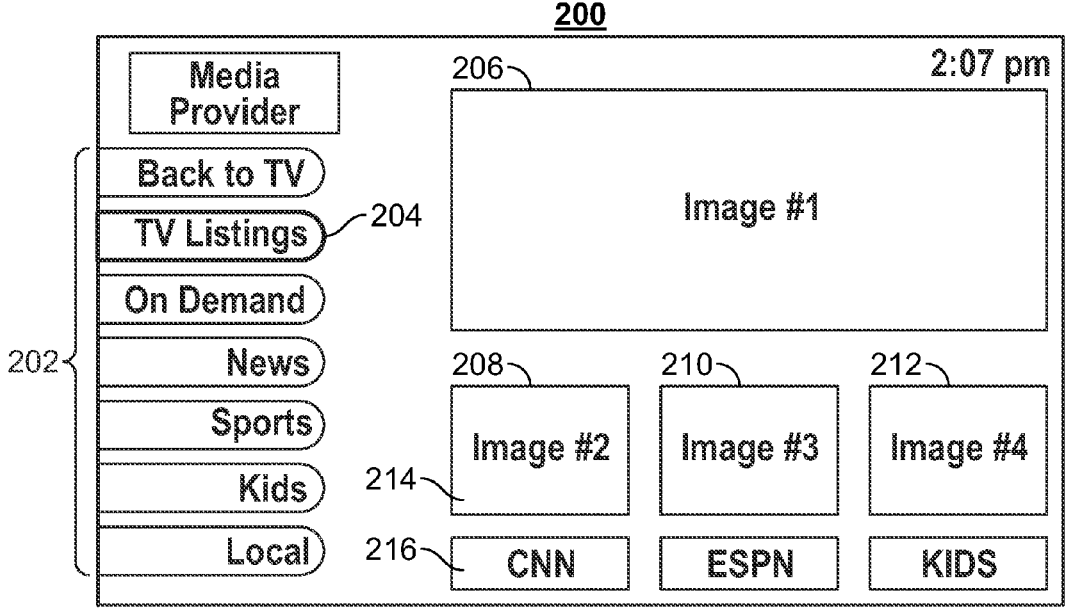

FIGS. 1 and 2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting a program and/or channel as a favorite, or purchasing a program, a subtitles setting, or other features. Options available from a main menu display may include search options, VOD options, parental control options, Internet options, cloud-based options, device synchronization options, second screen device options, options to access various types of media guidance data displays, options to subscribe to a premium service, options to enable/disable the subtitles setting, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. Selection of option 204 may return the user to grid 102 (FIG. 1).

In display 200 listings 206, 208, 210, and 212 may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210 and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
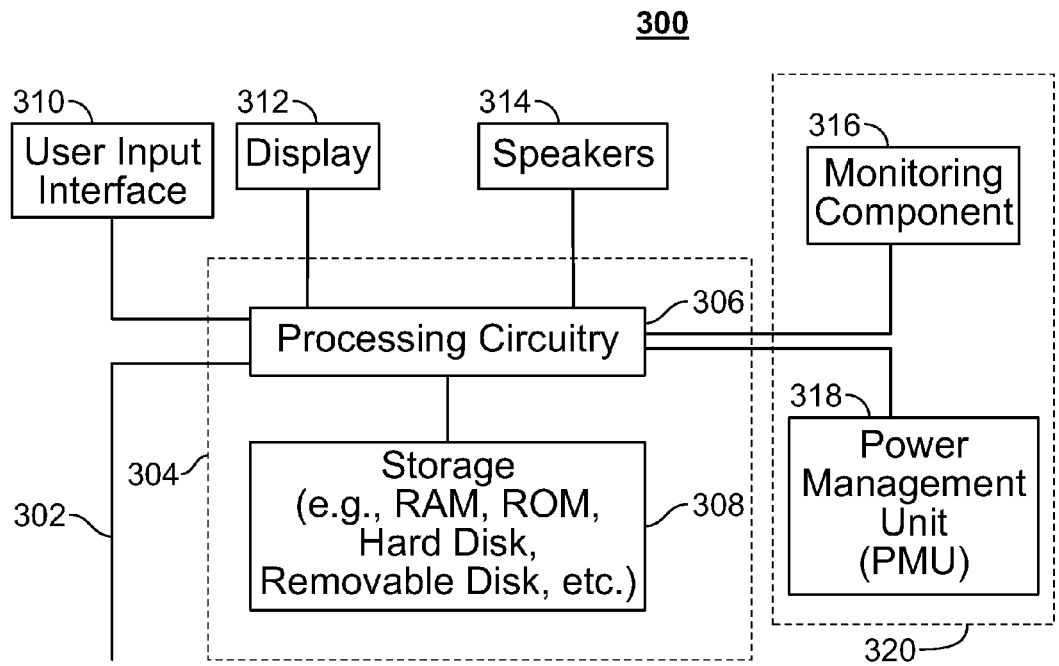
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306, detecting circuitry 320 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Control circuitry may also instruct detecting circuitry 320, which can be used to detect and/or identify a user or users without requiring the user or users to make any affirmative actions by using any suitable biometric determination technique, such as facial determination, brainwave information, body temperature determination, heart rate determination, odor determination, scent determination, body shape determination, voice determination, behavioral determination, any other suitable biometric determination technique or any combination thereof.

Detecting circuitry 320 may include monitoring component 316 and power management unit 318. Monitoring component 316 may include one or more components (e.g., an EEG, EMG, pulse oximeter, etc.) for monitoring an activity type (e.g., biometric state, location, or brainwave information) of a user. As referred to herein, "location" refers to any relative or absolute identifier of a position, such as a geographical coordinate, vector for direction, street address, name of building, or any other suitable identifier. For example, a location may be indicated by coordinates in a geographic coordinate system (e.g., latitude or longitude), or a global positioning system (GPS).

It should be noted, monitoring component 316 may, in some embodiments, be located on a separate device in communication with the device upon which a media guidance application (and control circuitry 304) is implemented. For example, in some embodiments, monitoring component 316 may communicate with device 300 via a communications network (e.g., communications network 414 (FIG. 4)). In some embodiments, monitoring component 316 may be a wearable device (e.g., a wristband, headband, watch, etc.).

Using microphones and voice recognition, control circuitry 304 may detect or identify users based on the physical characteristics of their vocal tract through voice recognition or identification. Using a sound source and an array of microphones, control circuitry 304 may determine information about the shape of the area surrounding the biometric device through acoustic localization, similar to the time-of-flight method described above in reference to IR light. For example, a sound source may be located near an array of microphones. A sound broadcast from the sound source may propagate as a wave front away from the source. As the wave front impacts an object, portions of the wave front may be reflected toward the sound source and array of microphones. Depending on the position of the object, the reflected sound may arrive at the microphone at different times. For example, the reflected sound may arrive at a closer microphone in a shorter amount of time than at a farther microphone. Based on the time or phase difference in arrival time at various microphones, total travel time of the sound, and positions of the microphones, it may be possible to generate a spatial areal map. Locations of objects may be determined based on the spatial areal map generated via acoustic localization, IR time of flight, any other suitable mapping method, or any combination thereof. It should be understood that various biometric techniques and devices may be used alone or in combination to supplement each other to more accurately identify or detect users.

In some embodiments, the media guidance application may respond to verbal commands or verbal input received from a user. Control circuitry 304 may include a voice recognition engine or circuitry with a phoneme encoder to process verbal input from a user. In some implementations, the human language sounds (e.g., utterances) may be received with one or more microphones and provided to the phoneme encoder of control circuitry 304. The phoneme encoder may convert the sounds into machine representations of the sounds using a phoneme representation. In one embodiment, the machine representations may be viewed as American Standard Code for Information Interchange (ASCII) representations of the phonemes, or the like, viewable as a sequence of alpha-numeric values. In one embodiment, the machine representations may employ symbols from the International Phonetic Alphabet (IPA) and/or extended sets adapted for use within a computer device.

As used herein, the term "phoneme" refers to a physical representation of a human language sound or utterance. Moreover, a phoneme is a representation of a sound of a language independent of its position in a word or phrase. Thus, phonemes represent sounds in the most neutral form possible. A variety of written representations of phonemes are known in the art, and as such virtually any representation may be used by the present disclosure. For example, in one embodiment, the phonemes may be represented by alpha-numeric symbols such as employed in the International Phonetic Alphabet (IPA), American Standard Code for Information Interchange (ASCII) format, or the like. However, as noted, the disclosure is not limited to this mechanism, and others may be used. As used herein, the term "word" refers to a single distinct meaningful element of speech or writing that matches one or more phoneme sequences. When multiple words match the same phoneme sequence, they are referred to as heterographs or words that are part of the same heterograph set.

Control circuitry 304 may cross-reference a detected phoneme sequence with a database 600 (FIG. 6) that maps phoneme sequences to words. The process of cross-referencing phoneme sequences with database 600 may be used to convert a received plurality of utterances from a user to textual words. After the utterances are converted to their corresponding digital words, the output may be provided to the media guidance application for further processing. For example, the media guidance application may process the identified words (corresponding to the received utterances) to generate recommendations, advertisements, perform search queries, load websites, or perform any other command that corresponds to the identified words. In some implementations, the media guidance application may cross-reference one of the identified words with a commands database to determine whether one or more of the words are commands. The media guidance application may identify a command corresponding to the identified words and perform the command (e.g., a search function). Other parameters of the command may be provided by other identified words or subsequently received utterances.

In some embodiments, control circuitry 304 may receive verbal input from the user that includes a plurality of utterances. For example, the user may utter the phrase "Duke v. Uconn". Each utterance may correspond to a particular word spoken by the user. Typically, the utterances are separated from each other by a brief moment of silence.

In response to receiving the utterances, control circuitry 304 may encode the utterances into phoneme sequences. For example, control circuitry 304 may encode each utterance using IPA as /duk/; /vi/; /yukɔn/ (where the semicolon represents the silence or the break between utterances). Control circuitry 304 may store each phoneme sequence using IPA in storage 308. Besides using IPA phonetic encoding, any other type of phonetic encoding or representation system can be used (e.g., SAMPA, X-SAMPA, Arpabet, extIPA, Kirshenbaum, etc.)

Control circuitry 304 may cross-reference the stored IPA for each utterance with database 600. Database 600 may be a local database or remote database. When database 600 is remote, control circuitry 304 may communicate the phoneme sequence or IPA to a server, which may then return to control circuitry 304 the corresponding word or words matching the phoneme sequence or IPA.

In some embodiments, in addition to cross-referencing the IPA output by phoneme encoder, control circuitry 304 may cross-reference database 600 with the IPA that is close to the IPA output by phoneme encoder. This may account for possible errors in speech detection or different ways some people say certain words. For example, the user may utter the term "bite", for which the phoneme encoder outputs the IPA representation as /baɪt/. In addition to cross-referencing the output of the phoneme encoder, /baɪt/, control circuitry 304 may also identify other IPAs that are close to /baɪt/. One such other IPA may be /braɪt/ (corresponding to the word "bright" which is close to "bite"). Accordingly, control circuitry 304 may retrieve from database 600 all words that match both IPAs.

In some embodiments, database 600 may return to control circuitry 304 the word or words corresponding to a given phoneme sequence. For example, for the IPA of duk, database 600 may return only one word that matches, "duke". For the IPA of /yukɔn/, database 600 may return multiple words along with an indication that the IPA received is a heterograph. Specifically, database 600 may return the set of words "Yukon" and "Uconn". In response to receiving the indication from database 600 that one of the phoneme sequences matches a heterograph set, control circuitry 304 may process each word in the heterograph set with other words received in the utterance to select the appropriate word. In some implementations, control circuitry 304 may use a knowledge graph 500 to determine which word in the heterograph set was intended by the user who uttered the word based on its relationship to other words uttered by the user.

In some embodiments, control circuitry 304 may identify a context for the first word and may determine which word in the heterograph set was intended by the user who uttered the word based on whether the word is associated with the context of the first word. For example, control circuitry 304 may determine that the word "duke" is a university. Accordingly, control circuitry 304 may set the context to be universities or college sports. Control circuitry 304 may determine whether the word "Yukon" or the word "Uconn" is associated with the context universities or the context college sports. In response to determining that the word "uconn" is associated with the same context as the word "duke" and that the word "Yukon" is not, control circuitry 304 may select the combination of words "Duke" and "Uconn" for processing as the user-intended input.

In some embodiments, control circuitry 304 may identify a context for the word in the heterograph set intended by the user who uttered the word based on a conjunction used in the phrase uttered by the user between the word in the heterograph and another word. For example, control circuitry 304 may determine that the conjunction used in the phrase "Duke v. Uconn" was "v.". Control circuitry 304 may cross-reference the conjunction "v." with a lookup table of conjunctions to determine the context for the conjunction. For example, control circuitry 304 may determine based on the lookup table that the conjunction "v." typically represents a competition, like a sporting event. Accordingly, control circuitry 304 may set the context to be competitions. Control circuitry 304 may determine whether the word "Yukon" or the word "Uconn" is associated with the context competitions. Specifically, control circuitry 304 may determine that the word "uconn" is associated with the context competitions, as Uconn is a university that is typically known to compete in sports and the word "Yukon" is not (as rivers are not known for competitions). Accordingly, control circuitry 304 may select the combination of words "Duke" and "Uconn" for processing as the user-intended input and not "Duke" and "Yukon".

In some embodiments, knowledge graph 500 may map a collection of words and their relationships to each other using entries for each word. Specifically, an entry 510 in knowledge graph 500 may include a word 520 and its corresponding IPA representation 530. Although the IPA representation is shown in knowledge graph 500, any other type of phonetic encoding or representation system can be used (e.g., SAMPA, X-SAMPA, Arpabet, extIPA, Kirshenbaum, etc.). A first entry is connected to a second entry by a weighted line 540. For example, the entry 510 for the word "Duke" may be connected by line 540 having a weight of "1" to the entry for the word "university". A low weight to a line may indicate a stronger or greater relationship between two words. Because Duke is a university, the weight of the line connecting the two entries in knowledge graph 500 is set to be the maximum value of "1". Similarly, the entry for the word "Duke" is connected to an entry 580 for the word "uconn" by a line 550 having a weight of "2" because there is a weaker relationship between the university Duke and the university Uconn. The lack of a visual connection in knowledge graph 500 between two entries indicates that the two entries are connected by a line with an infinite weight meaning the two corresponding words are unrelated to each other. As seen in knowledge graph 500, two words "Uconn" and "Yukon" have corresponding entries and identical IPA representations. Although the IPA representations are identical, the two entries are related to other entries by different weights because the corresponding words have different meanings.

In some embodiments, the weights between different entities in knowledge graph 500 may change over time. For example, two entities that represent two teams may be connected with a very strong weight (e.g., "2") when the two teams are in the same tournament. However, when the tournament is over and the teams are no longer playing each other, the weights between the two entities in knowledge graph 500 may be greater (e.g., "100" or infinity) indicating the two entities are less closely related. Specifically, the relationship between words and entities in knowledge graph 500 may adapt over time.

In some embodiments, control circuitry 304 may compute a distance between two or more words using knowledge graph 500. Specifically, control circuitry 304 may add up the weights to lines connecting different entries in knowledge graph 500 to determine the shortest distance. For example, if first and second entries are separated from each other in knowledge graph 500 by three other entries, control circuitry 304 may accumulate the lines connecting each of the three other entries to determine the distance between the first and second entries. Specifically, the distance between entry 510 for the word "Duke" and the entry 590 for the word "area" may be computed as four because entry 510 is separated from entry 590 by the entry for the word "North Carolina". That is, the distance between entry 510 and the entry for "North Carolina" is "1" and the distance between the entry for "North Carolina" and entry 590 is "3" which adds up to four.

In some embodiments, in response to receiving an indication from database 600 that a given phoneme sequence matches multiple words, control circuitry may first select a first word and process the selected first word with another word that corresponds to a different phoneme sequence. For example, control circuitry may first select the word "Yukon" in the heterograph set and combine the selected word with a target word that matches a different phoneme sequence that was received (e.g., "duke") to determine their relationship. Control circuitry 304 may use knowledge graph 500 to compute the distance between the combination of words "duke" and "Yukon" to determine how close or far the words are to each other in a knowledge graph 500. In particular, control circuitry 304 may determine that the shortest distance in knowledge graph 500 between entities corresponding to the word "duke" and the word "Yukon" is five (e.g., the weight of the line or connection between the entity for the word "Duke" to the entity for the word "North Carolina" being 1; the weight of the line or connection between the entity for the word "North Carolina" to the entity for the word "area" being 3; and the weight of the line or connection between the entity for the word "area" to the entity for the word "Yukon" being 1). Control circuitry 304 may store in storage 308 that value of the distance between the first selected word "Yukon" and the target word "duke".

Control circuitry may determine whether there are other words in the heterograph set for which to determine a distance to the target word. In this case, control circuitry 304 has "Uconn" in the heterograph set left to process with the target word. Control circuitry may next select the word "Uconn" in the heterograph set and combine the selected word with a target word (e.g., "duke") to determine their relationship. Control circuitry 304 may use knowledge graph 500 to compute the distance between the combination of words "duke" and "Uconn" to determine how close or far the words are to each other in a knowledge graph 500. In particular, control circuitry 304 may determine that the shortest distance in knowledge graph 500 between entities corresponding to the word "duke" and the word "Uconn" is 2 (e.g., the weight of the line or connection 550 between the entity for the word "Duke" to the entity for the word "Uconn" being "1"). Control circuitry 304 may store in storage 308 that value of the distance between the word "Uconn" and the target word "duke".

Control circuitry 304 may compare the distance between each word in the heterograph set and the target word. Control circuitry 304 may select as the intended combination by the user the word in the heterograph set having the smallest distance to the target word (the word that is most closely related to the target word). In this case, control circuitry 304 may determine that the intended combination for the utterances /duke/ and /yukɔn/ corresponds to "duke" and "uconn" rather than "duke" and "yukon". Control circuitry 304 may then provide this combination to the media guidance application to perform a media guidance function on the combination (e.g., perform a search or recommendation). For example, the media guidance application may generate a display of upcoming sporting events between the two sporting event teams ("Duke" and "Uconn").

In some embodiments, database 600 may return to control circuitry 304 multiple words for each utterance or sequence of phonemes that control circuitry 304 provides to database 600. For example, the multiple words corresponding to a given utterance may be the result of control circuitry 304 providing phoneme sequences that are near each other for one utterance. In such circumstances, control circuitry 304 may compute a distance between each combination of matching words to select the combination having the shortest distance (e.g., the combination of words that are most closely related to each other). For example, control circuitry 304 may provide a first phoneme sequence /a/ and a second phoneme sequence /b/ to database 600. Database 600 may in response return a first set of words matching the first phoneme sequence (e.g., words A, B, and C) and a second set of words matching the second phoneme sequence (e.g., words D and E). As a result, control circuitry 304 may generate six combinations of words (e.g., combination 1: A+D; combination 2: B+D; combination 3: C+D; combination 4: A+E; combination 5: B+E; and combination 6: C+E). Control circuitry 304 may determine a distance between each word in each combination using knowledge graph 500. For example, control circuitry 304 may determine that the words in combinations 1-6 have respective distances of 3, 2, 5, 10, 8, and 50. In response to determining that the words in combination 2 have the shortest distance and hence are most closely related, control circuitry 304 may automatically select combination 2 for further processing as the user's intended combination.

Accordingly, without receiving input from the user further to receiving the initial verbal input with the phrase "Duke v. Uconn", control circuitry 304 may output results of a search featuring the words "Duke" and "Uconn" even though the word "uconn" is in a heterograph set. Namely, the user need not be involved to resolve the ambiguity as to whether the user intended "uconn" the school or "yukon" the river for control circuitry 304 to provide the intended output (e.g., the school "Uconn"). This is because control circuitry 304 determines which of the multiple words in the heterograph set is the most likely intended word based on other contextual information, such as other words in the verbal input and their relationship to each word in the heterograph set.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. For example, storage 308 may be used to store database 600. Database 600 may include multiple entries. Each entry may include a phoneme sequence field and a corresponding words/heterographs field. The phoneme sequence field may identify a set of phonemes that represent a received utterance and the words/heterographs field may identify the textual representation of the word or words that match the phoneme sequence. Storage 308 may also be used to store knowledge graph 500 (FIG. 5) that stores a weighted relationship between different words. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, microphone, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
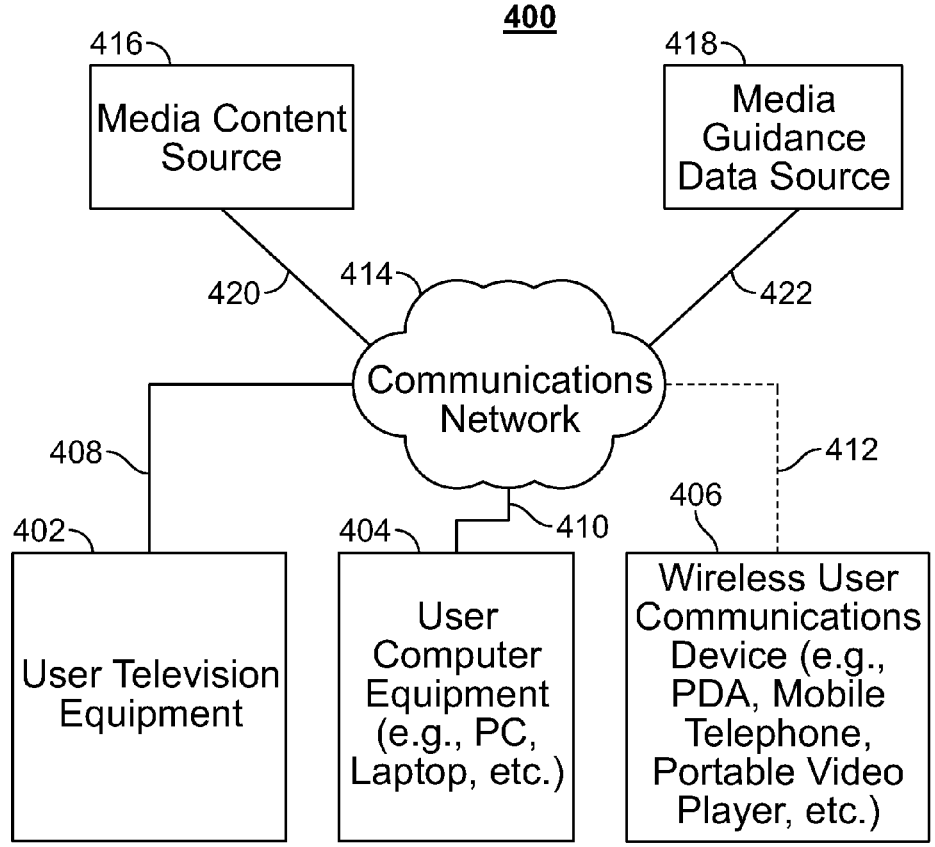
FIG. 4 is a block diagram of an illustrative media system in accordance with some embodiments of the disclosure.
Figure 5:
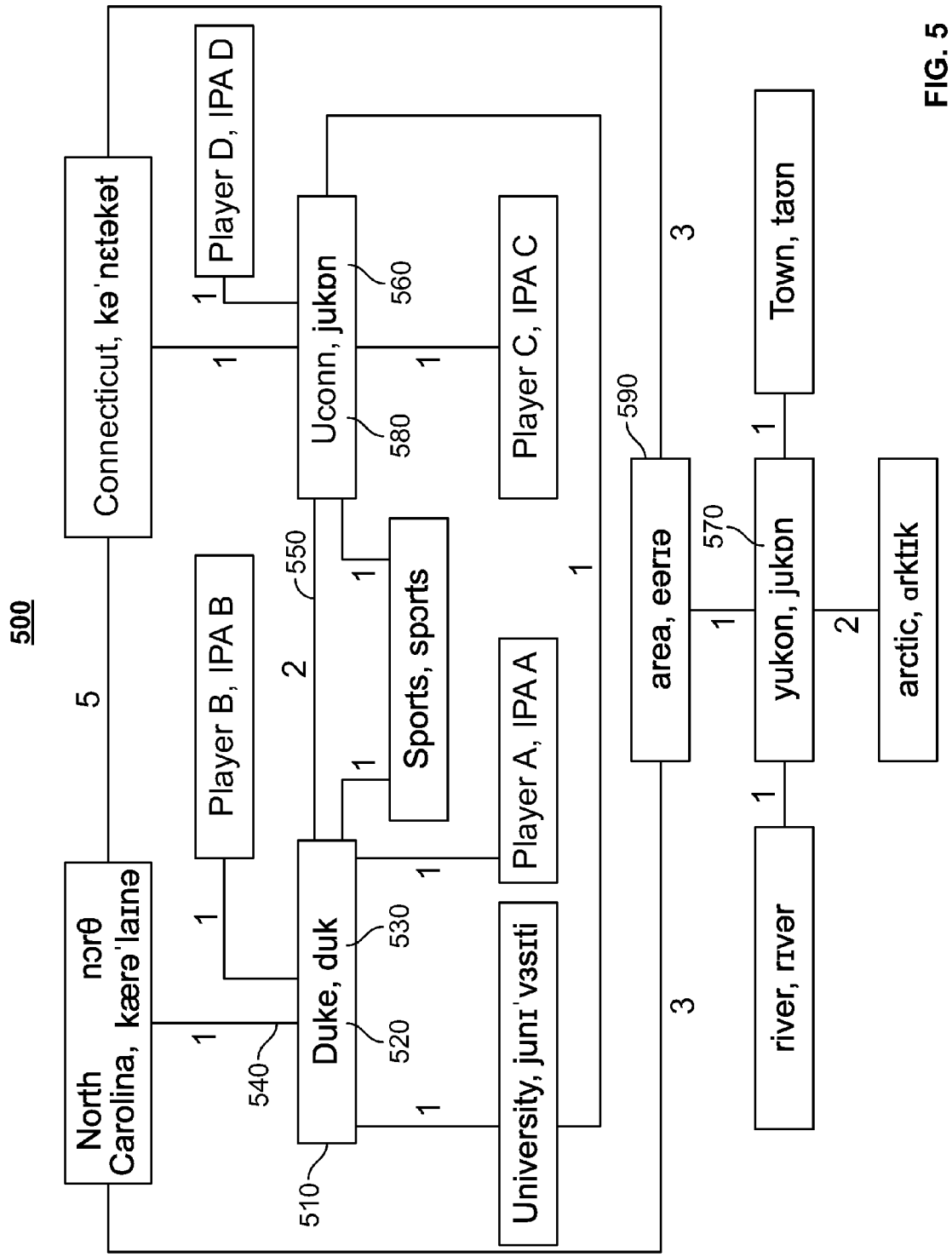
FIG. 5 shows an illustrative knowledge graph in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device. In some embodiments, the second screen device may provide verbal input to the first device. In some embodiments, the second screen device may be a thin client that cannot perform voice recognition or ASR but simply sends received utterances from a user to the first device. The first device may include the capability to perform ASR on the utterances received with the second screen device. In such cases, the first device may be a local or remote server. In some embodiments, the second screen device may include full capability to perform ASR on a received utterance and may transmit (if necessary) the corresponding words to the first device for further processing.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G, XLTE, and/or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays and process verbal input.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 7:
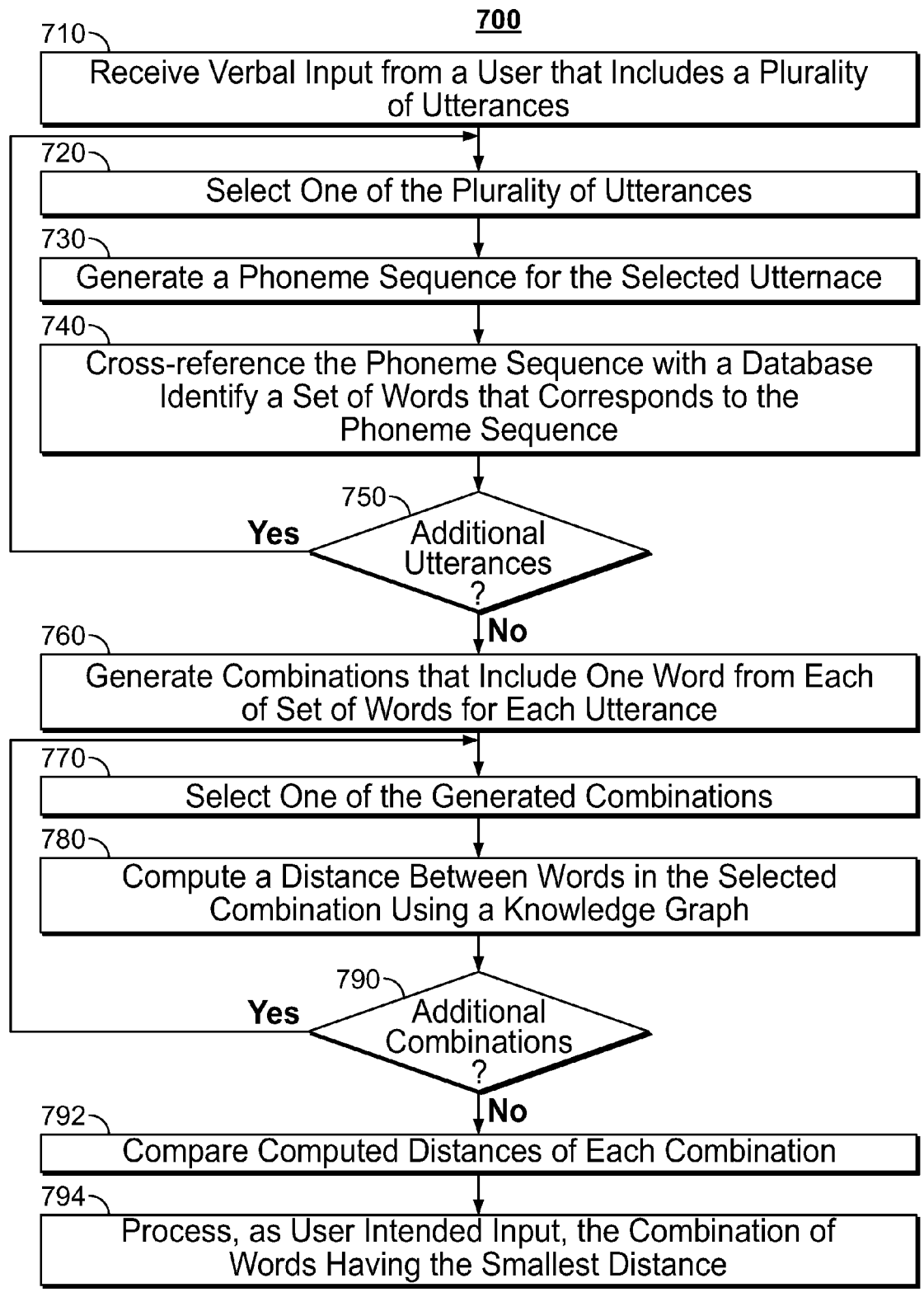
FIG. 7 is a diagram of a process for performing ASR in the presence of heterographs in accordance with some embodiments of the disclosure.

FIG. 7 is a diagram of a process 700 for performing ASR in the presence of heterographs in accordance with some embodiments of the disclosure. At step 710, verbal input from the user is received that includes a plurality of utterances. For example, a microphone may receive a verbal input from the user that includes the phrase "Duke v. Uconn".

At step 720, one of the plurality of utterances is selected. For example, control circuitry 304 may select the utterance corresponding to "Duke".

At step 730, a phoneme sequence is generated for the selected utterance. For example, a phoneme encoder may encode the utterance corresponding to "Uconn" to represent the utterance as the phoneme sequence /yukɔn/.

At step 740, the phoneme sequence is cross-referenced with a database to identify a set of words that corresponds to the phoneme sequence. For example, control circuitry 304 may cross-reference the phoneme sequence /duk/ with database 600 (FIG. 6) to identify the set of words corresponding to the phoneme sequence. For example, the set of words may include one word, "duke" that matches the phoneme sequence /duk/. Similarly, control circuitry 304 may cross-reference the phoneme sequence /yukɔn/ with database 600 (FIG. 6) to identify the set of words corresponding to the phoneme sequence. For example, the set of words may include two words, "Yukon" and "Uconn" that match the phoneme sequence /yukɔn/.

At step 750, a determination is made as to whether additional utterances remain. In response to determining that additional utterances remain, the process proceeds to step 720, otherwise the process proceeds to step 760.

At step 760, combinations that include one word from each set of words for each utterance are generated. For example, control circuitry 304 may generate one combination that includes the words "duke" and "Yukon" and another combination that includes the words "duke" and "uconn".

At step 770, one of the generated combinations is selected.

At step 780, a distance between words in the selected combination is computed using a knowledge graph. For example, control circuitry 304 may compute a distance between the words in the combination of "duke" and "Yukon" to be "5". Similarly, control circuitry 304 may compute a distance between the words in the combination of "duke" and "uconn" to be "2".

At step 790, a determination is made as to whether additional combinations remain. In response to determining that additional combinations remain, the process proceeds to step 770, otherwise the process proceeds to step 792.

At step 792, the computed distances of each combination are compared.

At step 794, the combination of words having the smallest distance are processed as the user-intended input. For example, control circuitry 304 may select the combination of the words "duke" and "uconn" as the distance is "2" which is less than "5" indicating this combination of words to be more relevant to each other. Control circuitry 304 may perform a media guidance function using the selected combination (e.g., perform a search or recommendation). Specifically, in response to receiving the verbal input from the user with the phrase "Duke v. Uconn", control circuitry 304 may output all the games featuring these two schools together without further input from the user even though the term "uconn" in the phrase is a heterograph which phonetically matches multiple words.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for performing automatic speech recognition (ASR) when a heterographic word is present, the method comprising:
receiving verbal input from a user that comprises a plurality of utterances;
matching a first of the plurality of utterances to a first word;
determining a word that describes the context for the first word;
determining that a second utterance in the plurality of utterances matches a plurality of words that are in a same heterograph set;
combining a second word chosen from the plurality of words with the word that describes the context for the first word to generate a first combined set of words;
storing a first value representing a distance between words in the first combined set of words;
combining a third word chosen from the plurality of words with the word that describes the context for the first word to generate a second combined set of words;
storing a second value representing a distance between words in the second combined set of words;
in response to determining that the second value is smaller than the first value, performing a media guidance application function on an available media asset based on the second combined set of words.

2. The method of claim 1 further comprising:
storing a knowledge graph of a relationship between words, wherein a distance between words in the knowledge graph is indicative of strength in relationship between the words; and
calculating the first value and the second value based on the distance between the words in the first combined set of words and the distance between the words in the second combined set of words.

3. The method of claim 2 further comprising:
identifying positions, in the knowledge graph, of the context of the first word and each of the plurality of words; and
computing, based on the identified positions, a distance between the context of the first word and each of the plurality of words.

4. The method of claim 1, wherein the first word is a name of a competitor in a sporting event, further comprising:
setting the context to be the sporting event; and
determining which of the plurality of words corresponds to the sporting event, wherein the third word corresponds to another competitor in the sporting event.

5. The method of claim 1, wherein the plurality of words that are in the same heterograph set are phonetically similar to each other.

6. The method of claim 1 further comprising generating a recommendation based on the first word and the third word.

7. The method of claim 1, wherein matching the first of the plurality of utterances to the first word comprises determining that the first utterance phonetically corresponds to the first word.

8. The method of claim 1, wherein the first word is a name of an actor in a media asset, further comprising:
setting the context to be the media asset; and
determining which of the plurality of words corresponds to the media asset, wherein the third word corresponds to another actor in the media asset.

9. The method of claim 1 further comprising determining the context based on a conjunction between two of the plurality of utterances.

10. A system for performing automatic speech recognition (ASR) when a heterographic word is present, the system comprising:
control circuitry configured to:
receive verbal input from a user that comprises a plurality of utterances;

match a first of the plurality of utterances to a first word;
determine a word that describes the context for the first word;
determine that a second utterance in the plurality of utterances matches a plurality of words that are in a same heterograph set;
combine a second word chosen from the plurality of words with the word that describes the context for the first word to generate a first combined set of words;
store a first value representing a distance between words in the first combined set of words;
combine a third word chosen from the plurality of words with the word that describes the context for the first word to generate a second combined set of words;
store a second value representing a distance between words in the second combined set of words; and
in response to determining that the second value is smaller than the first value, perform a media guidance application function on an available media asset based on the second combined set of words.

11. The system of claim 10, wherein the control circuitry is further configured to:
store a knowledge graph of a relationship between words, wherein a distance between words in the knowledge graph is indicative of strength in relationship between the words; and
calculate the first value and the second value based on a distance between the words in the first combined set of words and the words in the second combined set of words.

12. The system of claim 11, wherein the control circuitry is further configured to:
identify positions, in the knowledge graph, of the first word and each of the plurality of words; and
compute, based on the identified positions, a distance between the first word and each of the plurality of words.

13. The system of claim 10, wherein the first word is a name of a competitor in a sporting event, and wherein the control circuitry is further configured to:
set the context to be the sporting event;
determine which of the plurality of words corresponds to the sporting event, wherein the third word corresponds to another competitor in the sporting event.

14. The system of claim 10, wherein the plurality of words that are in the same heterograph set are phonetically similar to each other.

15. The system of claim 10, wherein the control circuitry is further configured to generate a recommendation based on the first word and the third word.

16. The system of claim 10, wherein the control circuitry is further configured to match the first of the plurality of utterances to the first word by determining that the first utterance phonetically corresponds to the first word.

17. The system of claim 10, wherein the first word is a name of an actor in a media asset, and wherein the control circuitry is further configured to:
set the context to be the media asset; and
determine which of the plurality of words corresponds to the media asset, wherein the third word corresponds to another actor in the media asset.

18. The system of claim 10, wherein the control circuitry is further configured to determine the context based on a conjunction between two of the plurality of utterances.

* * * * *